July 20, 1965 E. F. STIEVENART ETAL 3,195,435
APPARATUS FOR PREPARING SPIRIT DUPLICATING MASTERS
Filed Dec. 17, 1962 5 Sheets-Sheet 1

INVENTORS
E. F. Stievenart
H. F. Deconinck,
BY Watson, Cole, Grindle & Watson
ATTORNEYS

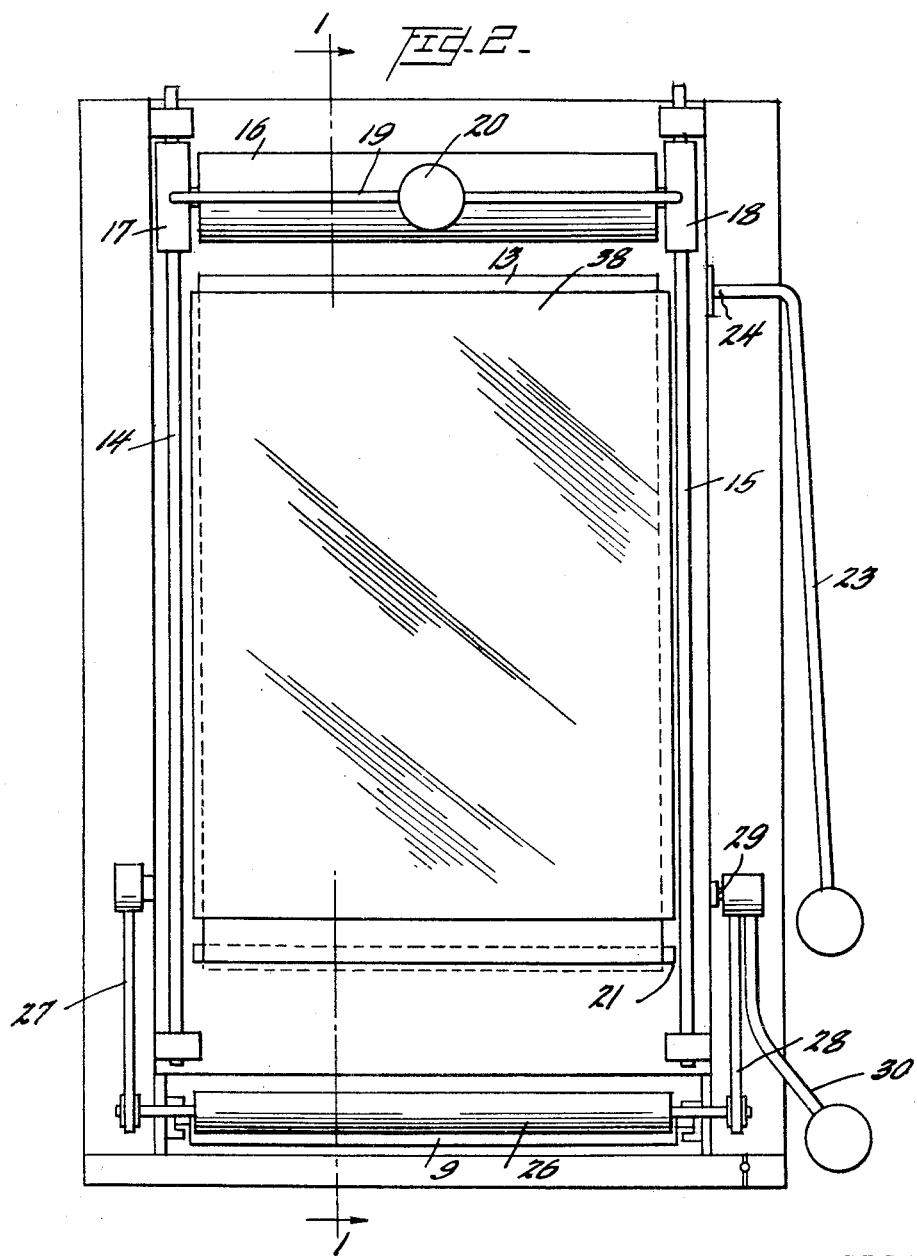

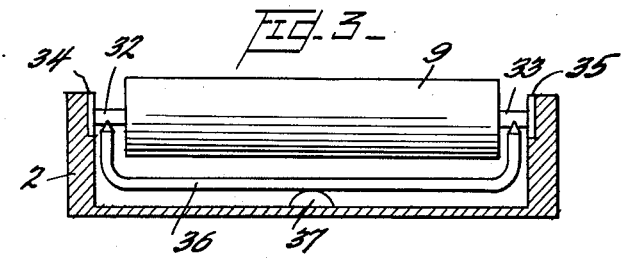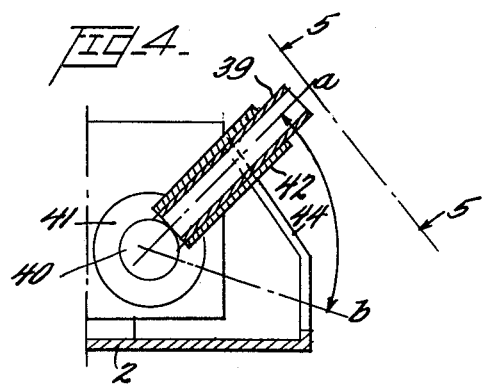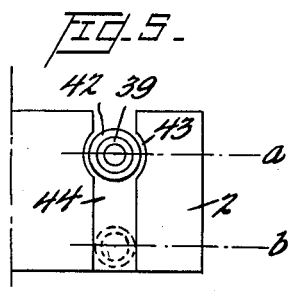

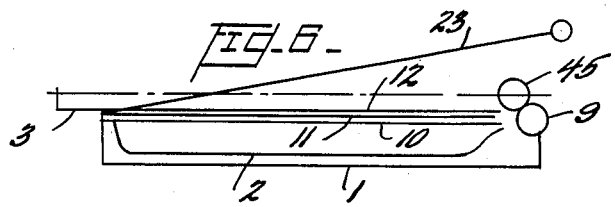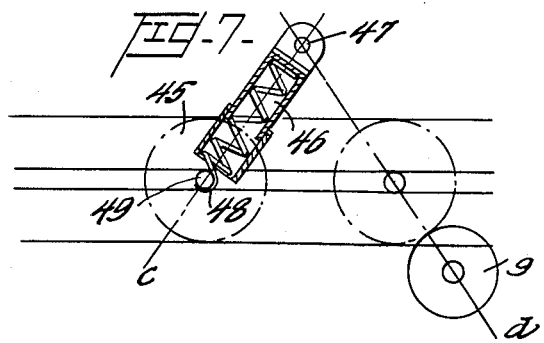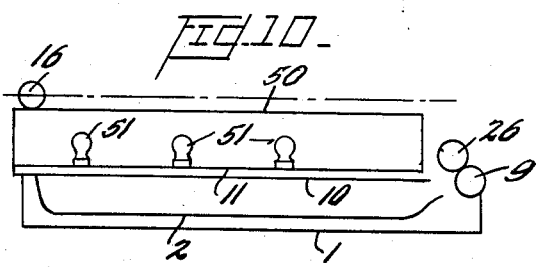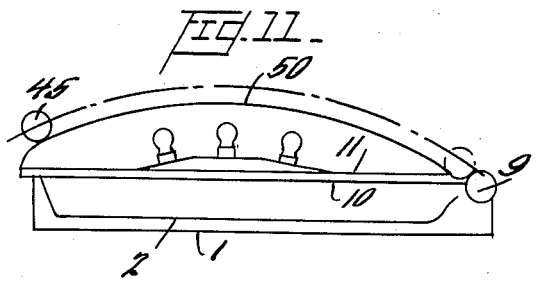

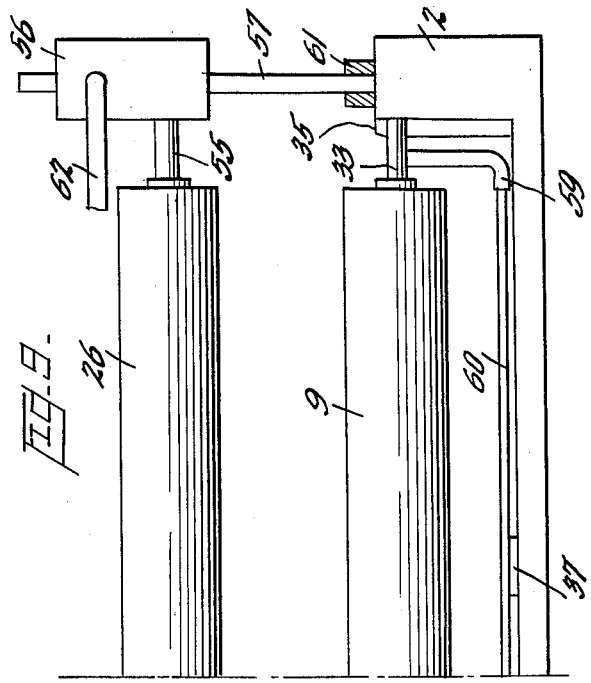
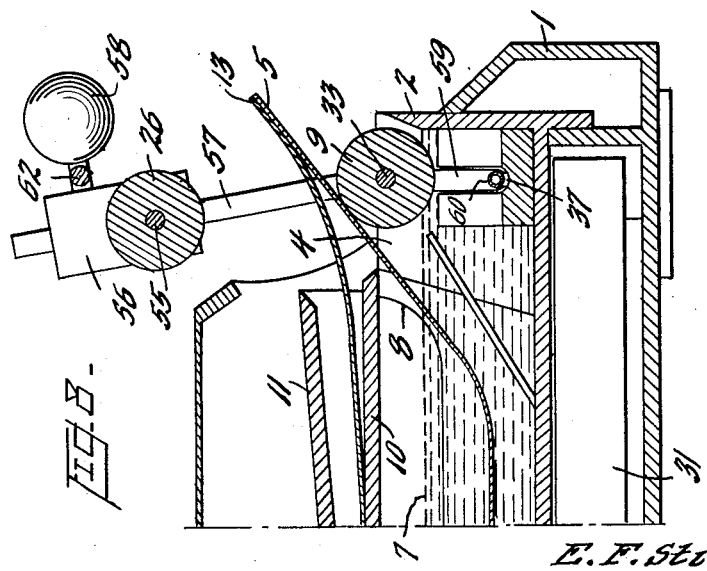

United States Patent Office 3,195,435
Patented July 20, 1965

3,195,435
APPARATUS FOR PREPARING SPIRIT
DUPLICATING MASTERS
Emiel Frans Stievenart, Kiel-Antwerp, and Hugo Frans
Deconinck, Deurne-Zuid, Antwerp, Belgium, assignors to Gevaert Photo-Producten N.V., Mortsel-Antwerp, Belgium, a Belgian company
Filed Dec. 17, 1962, Ser. No. 245,267
Claims priority, application Netherlands, Dec. 18, 1961,
272,663; Mar. 26, 1962, 276,392
7 Claims. (Cl. 95—89)

The present invention relates to an apparatus for preparing spirit duplicating masters which are appropriate for use in spirit duplicating processes. More particularly, the present invention relates to an apparatus for performing the process for obtaining, according to the photographic method, duplicating masters described in the U.S. Patent application 101,614, now Patent No. 3,159,485.

According to said method a sheet provided with a layer containing or consisting of a dyestuff is pressed against a sheet containing a gelatin silver halide emulsion layer, in which a developed photographic image of the matter to be duplicated has been formed and which exhibits a greater gelatin hardness in the areas where the silver halide has been reduced to silver, and the said layers are subsequently separated with simultaneous transfer of emulsion in those areas where the silver halide emulsion has not been reduced to silver, to the sheet provided with a layer containing or consisting of a dyestuff, then this latter sheet, to which the emulsion was transferred is pressed against a receptor sheet and finally this receptor sheet is separated from the sheet provided with a layer containing or consisting of a dyestuff.

Then the receptor sheet is ready for the manufacture of prints by spirit duplicating process, e.g. by means of the generally used spirit duplicating apparatus.

The object of the present invention is to provide an apparatus which allows to perform, in a simple and practical way the complete processing according to the method of the U.S. patent application 101,614.

A further object of the present invention is to provide an apparatus which requires but little technical knowledge from the operator for the manipulation of this apparatus.

Another object of the present invention is also to provide a clean apparatus i.e. which does not cause any dirtying of the operator's hands, the table on which it is positioned, etc.

Still another object of the present invention is to provide an apparatus in which the pressing of the sheet with the dyestuff containing layer against the sheet containing the silver halide emulsion layer is performed in a very uniform way.

According to the present invention the apparatus for preparing duplicating masters which are appropriate for use in a spirit duplicating process, comprises (1) a developing tank provided with an opening situated above the level of the developing liquid, through which an exposed sheet of photographic material is introduced in the developing liquid and withdrawn from same, (2) a space above the developing tank having at least one opening, situated above the opening of the developing tank and intended for introducing and withdrawing, together with the developed sheet of photographic material, a sheet containing a dyestuff, (3) pressure means with rollers positioned near the openings of the developing tank and the space above the developing tank, with two positions, viz. an open position for permitting the introducing of both materials in the apparatus apart from each other and a closed position for permitting the withdrawal of these materials pressed together, (4) a flat plate above said space with gripping means for holding the dyestuff sheet during its separation from the sheet of photographic material, and (5) also a pressure means with a roller which is movable on said flat plate for pressing the receptor sheet against the separated dyestuff containing sheet.

These and other characteristics of the apparatus according to the present invention are illustrated by the following examples.

FIG. 2 is a top view of the apparatus according to FIG. 1.

FIG. 3 is an enlarged vertical cross section of the movably mounted lower press roller in the developing tank.

FIG. 4 is a vertical section of the drain off system of the apparatus according to FIG. 1.

FIG. 5 is a front view of this drain off system on line 5—5 in FIG. 4.

FIG. 6 is a schematic view of a modified embodiment of the apparatus.

FIG. 7 is a detail of a spring loaded system showing two stable positions.

FIG. 8 is a part of a longitudinal section of a pressure system according to a modified embodiment of the apparatus.

FIG. 9 is a part of vertical cross section of the pressure system according to FIG. 8.

FIG. 10 is a schematic view of a modified embodiment of the apparatus with added exposure system.

FIG. 11 is a schematic view according to a modified embodiment of the apparatus according to FIG. 10.

Figure 1:
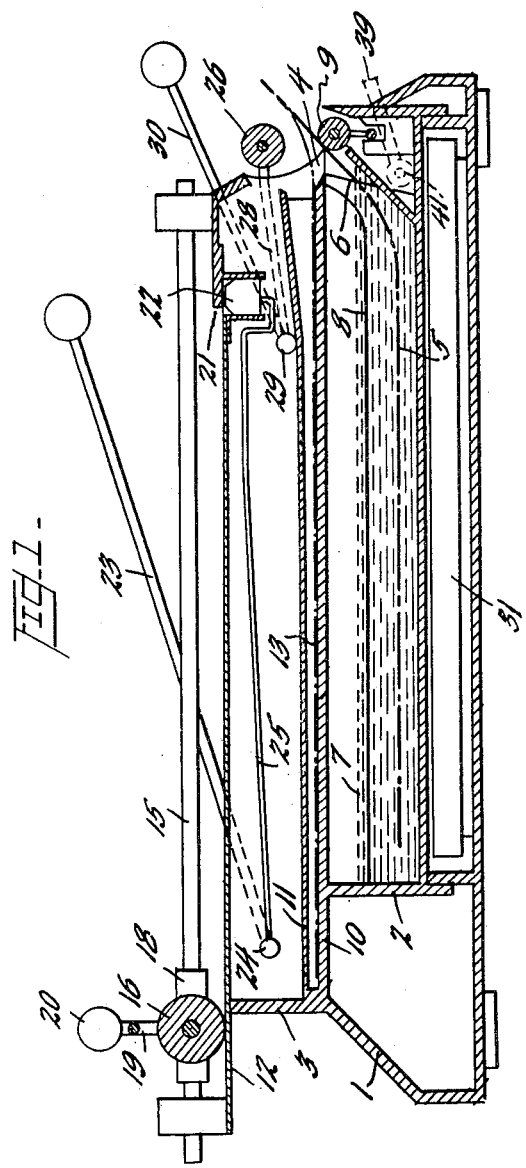
FIG. 1 is a vertical longitudinal section of one embodiment of the apparatus according to the present invention on line 1—1 of FIG. 2.

The apparatus according to FIG. 1 consists of a lower part 1 containing a developing tank 2, and a removable upper part 3.

The lower part 1 of the apparatus principally comprises positioning elements to secure both the developing tank and the upper part in place.

The lower part comprises also an electrical heating element 31, the surface of which is contacting the bottom of the developing tank 2 and which is thermostatically regulated so that the temperature of the developing bath is kept constant.

The developing tank 2 is provided with an inlet opening 4 for introducing the exposed sheet of photographic material 5, the gelatin emulsion side of which faces upwards. The guiding of the sheet 5 is done by the two side plates 6 whereas the immersion of this sheet under the level 7 of the developing liquid is assured by the ribs 8 which are attached to the underside of the upper part 3. In the opening 4 of the developing tank a free rotating press roller 9 is positioned; further details of this press roller will be given hereinafter in the description.

The upper part 3 of the apparatus comprises a bottom plate 10, above which at a small distance a plate 11 is parallelly fitted, and an upper plate 12. The planes of these plates 10 and 11 define a space into which a sheet 13 containing a dyestuff layer is introduced in advance of its rmoval from the apparatus together with the sheet of photographic material 5. On the upper plate 12 two guide bars 14 and 15 are mounted which are used for guiding the press roller 16. This press roller is carried by two guide bushings 17 and 18 which are smooth gliding over the bars 14 and 15. These guide bushings 17 and 18 are joined by the bar 19. A handle 20 which is attached to the centre of this bar, allows the press roller to move on the upper plate 12.

The upper plate 12 is also provided with a slot 21 into which a sheet lying on the upper plate is pressed by means of the press member 22. This press member is controlled by the lever 23 aside of the apparatus, which is provided with a system for securing the lever in its upward and downward position. The lever 23 is attached to the horizontal shaft 24. At the interior side of the apparatus said shaft 24 is provided with a bar 25 by means of which the press member 22 is moved in upward and downward direction.

The part of the upper plate 12, which is situated behind the slot 21 (shown at the right side of the slot in FIG. 1), is positioned at some higher level so that the edge of the sheet is pressed horizontally.

Finally, the upper part of the apparatus is provided with a press roller 26. This roller is movably mounted and can be set in a closed and in an open position. In open position the press roller is directed upwards and then the inlet opening 4 of the developing tank 2 and the space between the plates 10 and 11 are freely accessible. In closed position the press roller 26 is directed downwards and presses on the press roller 9 in the developing tank 2. The press roller 26 is mounted between two arms 27 and 28 which are attached to the horizontal shaft 29.

The press roller 26 is set in closed or open position by means of the lever 30 which is also mounted on the shaft 29. This system has two stable positions (not illustrated in the figures) for securing the press roller 26 in its opened and closed positions, respectively.

In order to obtain an equal pressure over the full length of the roller during the pressing of the roller 9 on the roller 26, it is desired that at least one of these rollers can be adjusted to some extent. In the present apparatus the adjustment is realized by designing the press roller 9 as a balance roller. This system is represented in detail in FIG. 3. It can be seen that the shaft ends 32 and 33 of the roller 9 are freely moving in the vertical slots 34 and 35 in the side walls of the developing tank 2; both the shaft ends of the roller also rest on a U-shaped element 36 which is supported in the middle by an elevational part 37 on the bottom of the developing tank. It is quite clear that the roller is allowed to execute an equalizing movement in the vertical plane whereby a uniform pressing against the press roller 26 is assured.

The operation of the apparatus will now be described in detail.

As light-sensitive photographic material 5 is used a paper support coated with a contrasty silver halide emulsion layer of the type which after image-wise exposure and development gives a negative image, and whereto 40 g. of urea per kg. of emulsion have been added.

The light-sensitive paper 5 is reflectographically exposed to a positive original and then introduced into the developing tank 2 through the opening 4, with the emulsion side directed upwards. At the same time a dyestuff containing sheet 13 of the type commonly used for preparing duplicating masters for spirit duplicators by mechanical means, for instance with a typewriter, and the dyestuff layer of which is not covered with a protective coat, is inserted in the space between the plates 10 and 11. During this step care should be taken that the dyestuff side of the dyestuff containing sheet is turned in downward direction. The dyestuff containing sheet 13 and the light-sensitive paper 5 are now fully situated within the apparatus except for a 1 cm. wide part which extends externally thereof.

The developing tank contains a tanning developer of the following composition:

| | | |
|---|---|---|
| Water | cm.³ | 800 |
| Urea | g | 60 |
| Anhydrous sodium carbonate | g | 30 |
| Pyrocatechol | g | 6 |
| Potassium ascorbinate | g | 2 |
| Water to | cm.³ | 1000 |

The heating element 31 maintains the temperature of the developer at a constant value of 30° C. The exposed parts of the emulsion layer are blackened and hardened, and form a laterally reversed negative image of the original.

After 21 sec. the lever 30 is pushed downwards and the sheets 5 and 13 are withdrawn from the apparatus between the rollers 9 and 12 pressed on each other, by pulling the protruding edges. Said withdrawal has to be done rather quickly (2 to 4 sec.).

The sheets pressed together are laid on the upper plate 12 of the apparatus in such a way that the dyestuff containing sheet is directed downwards, and so that the dry free edge of about 1 cm. of said sheet is slid into the slot 21. By raising the lever 23 the press member 22 is pressed against the underside of the plate 12 so that the free edge of the dyestuff containing sheet is firmly held.

About 20 to 30 sec. after both the sheets were removed from the developing tank the sheet 5 is separated from the dyestuff containing sheet 13 which is still firmly held. The unhardened parts of the emulsion of sheet 5 adhere to the dyestuff layer of the sheet 13.

Next the receptor sheet 38, i.e., a sheet of ordinary glossy white paper, is laid on the sheet 13 and pressed to same by the press roller 16 which is rolled, at least once, over the two sheets by means of the handle 20.

Two minutes after its pressing, the receptor sheet 38 is separated from the dyestuff containing sheet 13 and is ready for being used as a duplicating master for the preparation of a plurality of prints by means of a commonly available spirit duplicator.

For emptying the developing tank 2, the apparatus is provided with a system which is shown in detail in FIG. 1. This system is located at one side of the developing tank 2 near the inlet opening 4. Said system principally consists of a small tube 39 which is pivotally fitted in the sidewall of the developing tank near the opening 40. The sealing is done by means of a sealing ring 41. In position a, the outlet opening of the tube is situated above the level of the liquid in the developing tank 2. In position b, the outlet opening of the tube is under the bottom of the developing tank.

The tube 39 is retained in its position a by means of a small cylinder 42 which is put over the tube and which fits into the space 43 of the slot 44 at the front side of the developing tank of the apparatus (see FIG. 5).

To empty the developing tank, the cylinder 42 is removed from the tube 39 at the front side of the apparatus, thus enabling the tube to lower down in the slot 44 so that the developing tank is drained off.

The foregoing draining off system is very simple and allows the emptying of the developing tank without any further need for its removing, tipping over, etc. The cylinder 42 is a very simple locking means by which troubles, which in other known systems may arise from unsufficiently closing valves, valves which have a difficulty recognizable open or closed position, etc., are avoided. The extremity of the tube 39 can be provided with a suitable connection system so that, e.g., a bottle filled with developing liquid can be connected to it.

A modified embodiment of the apparatus is schematically shown in FIG. 6, in which figure the parts already mentioned in the foregoing figure are indicated by the same numerals.

According to this embodiment the press rollers 16 and 26 are replaced by one single press roller 45. This press roller 45 can be moved on the upper plate 12 up to contact the press roller 9. Hereby the construction of the apparatus is very simplified. The press roller 45 is pressed against the press roller 9 during the pressing of the dyestuff containing sheet 13 on the developed sheet of photographic material 5 by means of the system which has been illustrated in detail in FIG. 7. In this FIG. 7 a spring loaded system 46 is shown which is pivotally mounted in point 47 and the underside of which is provided with a hook 48. Said system has two stable positions c and d, and is fitted at either side of the press roller 45.

The operation is as follows:

When the press roller 45 is positioned above the plate 12 for pressing the receptor sheet 38 against the dyestuff containing sheet 13, the spring loaded system 46 is in position c. When the press roller 45 has to be pressed on the press roller 9, the press roller 45 is fully moved to the right. Thereby the shaft end 49 will engage in the hook 48, then contract the spring loaded system 46 and finally turn same over to position d. In the latter position the press roller 45 is firmly pressed against the press roller 9. Since the press roller 45 is controlled at both sides by an independently acting spring system, this roller is sufficiently freely adjustable, in order that the balance system for the balanced mounting of the roller 9 could be omitted.

In order to obtain a still more uniform pressing of the sheets 5 and 13, in case the apparatus according to FIGS. 1 and 2 is used, the U-shaped element 36 bearing the lower press roller 9 can advantageously be constructed as a spring element. Moreover, fixed abutment means can be provided against which the upper press roller 26 abuts when this roller is in its closed position.

This embodiment is represented in the FIGS. 8 and 9. The shaft 55 of the upper press roller 26 is carried by two guide bushings 56 which are easily movable over the bars 57. In FIG. 9 only one half of the pressing system is represented but it is evident that the system is fully symmetrical. The guide bushings 56 are connected to each other by a bar 62. A handle 58 in the centre of this bar allows to press the roller 26 against the roller 9. Spring means are provided (not shown) for maintaining the press roller 26 in open upward position.

The shaft extremities of the press roller 9 are freely movable in the slots 35 in the sidewalls of the developing tank 2. At the same time these shaft extremities rest on the L-shaped bumper elements 59, which also slide in the slots 35. These elements 59 are linked to each other by a spring 60. This spring 60 is attached in its centre to the elevational part 37 in the developing tank 2.

The abutment members for the press roller 26 are formed by bushings 61 which are slid over the bars 57. These bushings are given such a length that during a downward movement of the press roller 26, a certain distance between the under side of the bushings 56 and the upper side of the bushings 61 still remains, when the press rollers 26 and 9 are already contacting each other. When the press roller 26 is further pushed by means of the handle 58 in downward direction until the closed position is reached, then both the guide bushings 56 abut against the bushings 61 and the horizontal position of the press roller 26 is assured. The buffer elements 59 firmly press the roller 9 against the roller 26. Next the sheets 5 and 13, situated between the two press rollers, can be withdrawn from the apparatus thus assuring a uniform pressing of these sheets on each other.

According to an improved embodiment of the present invention a gripping system can be provided which restrains the press roller 26 in its closed position so that the operator can use both his hands for manipulating the sheets 5 and 13 during their withdrawing between the press rollers 9 and 26. When both sheets are removed the holding system of the press rollers is unlocked, whereby the roller 26 is moved again to its open position under the influence of the spring means.

The rectilinear guiding of the press roller 26 needs not necessarily to be realized by means of the guide bars 57 but can also be executed in a much simpler way, e.g., by providing the exterior side of the guide bushings 56 with a lateral protruding part which slides into a vertical recess in the interior side of the sdiewalls of the apparatus.

By constructing a number of parts in a synthetic material, the manufacturing costs can be reduced. Some mechanical clearance which always arises with such constructions in synthetic material, does not at all affect the regular working of the pressing system according to the present invention, since the upper roller 26 in the closed position always abuts against the two abutment members 61, whereby it is adjusted in a perfect horizontal position, and the lower roller 9 is uniformly pressed against the roller 26 by the spring loaded system.

It is evident that the invention is not limited to the foregoing embodiments. The apparatus according to the present invention can also be provided with an added exposure system e.g. for exposing the photographic material 5 reflectographically to the original to be printed. In this case the glass plate above the light source can successfully be used as a pressing means for the press roller 16. Such a system is schematically illustrated in FIG. 10. Here a glass plate 50 is positioned above the lamps 51. The sheet of photographic paper 5 is laid on the glass plate 50 with the emulsion side turned upwards, and on said sheet the original to be printed is laid with the side to be printed turned downwards. Pressing is done by means of a cover which is not represented in the figure. After the sheet 5 has been exposed to the original, the development is carried out as described hereinbefore. After separation, the dyestuff containing sheet 13 is laid on the glass plate 50, on which a sheet of ordinary paper is then laid, whereupon both sheets are pressed on each other by means of the press roller 16. Thus, the glass plate 50 has here the same function as the plate 12 shown in FIG. 1.

If, for the apparatus with added exposure system according to FIG. 10, one will make use of a common press roller 45 as represented in FIG. 6, the embodiment according to FIG. 11 can successfully be applied. Here the glass plate 50 has a curved construction so that the press roller 45, which follows an identically curved course, can be pressed against the press roller 9 at the end of this curved course near the opening of the developing tank 2. Said pressing can be performed by a similar system as shown in FIG. 7.

Finally, the press rollers in the apparatus according to the foregoing examples, especially the press rollers 9 and 26, can be provided with manual or electrical driving means.

The apparatus can be designed to be opened in some other way. E.g., in the apparatus represented in FIG. 1, the upper part containing the flat plate 12, the press system with the roller 16 and the plate 11, can be built as one complete constructional part which can be removed, entirely or in part, from the plate 10 in order to facilitate the introducing of the dyestuff containing sheet 13, the cleaning of the apparatus, etc.

We claim:

1. Apparatus for photographically preparing a duplicating master adapted for making copies in a spirit duplicating process, said apparatus comprising a tank for containing a developing liquid, said tank having an elongated aperture adjacent one end above the level of liquid therein for ingress and egress of an exposed sheet of photographic material to and from said tank; a compartment extending generally above said tank for receiving and maintaining out of contact with said liquid a dyestuff sheet to be contacted with the exposed and developed photographic sheet, said compartment having an elongated aperture adjacent and parallel to said tank aperture; a pair of cooperating pressure rollers disposed proximate said apertures, one of said rollers being displaceable from the other to expose said apertures for introduction of said sheets into the tank and compartment respectively, said rollers otherwise being biased together for pressing said sheets into intimate contact upon withdrawal from the tank and compartment; a surface at least coextensive in size with said sheets arranged generally above said compartment for supporting said sheets after such withdrawal; means adjacent said surface for engaging a marginal edge portion of said dyestuff sheet to facilitate separation by peeling of the two sheets; an elongated pressure means movable over said surface to intimately contact a receiving sheet with said dyestuff sheet; and guide means for guiding the axis of said pressure means in generally parallel relationship to said edge portion engaging means.

2. Apparatus as in claim 1 wherein the ends of one of said cooperating pressure rollers are yieldably supported for limited movement relative to said other rollers by a yoke having its terminations engaging said ends and fulcrumed at substantially its midpoint.

3. Apparatus as in claim 2 wherein said yoke is comprised of resilient material permitting bodily movement of said supported roller.

4. Apparatus as in claim 2 wherein the limits of movement of said displaceable roller toward said other roller is determined by fixed abutments engaged by said roller.

5. Apparatus as in claim 1 wherein said displaceable roller is adapted upon such displacement for movement over said surface, functioning as said last-mentioned pressure means.

6. Apparatus as in claim 5 including a bistable spring system arranged adjacent the edge of said surface proximate said apertures, said system in one position being disposed to releasably engage said displaceable roller upon arrival at said surface edge and in said other position to maintain said roller in contact with said other roller.

7. Apparatus as in claim 1 wherein said edge portion engaging means comprises a slot in said surface adjacent one end thereof, a gripper member in said slot, and means to operate said gripper member.

References Cited by the Examiner

UNITED STATES PATENTS

| | | | |
|---|---|---|---|
| 1,952,629 | 3/34 | Newgard | 101—131 |
| 2,742,838 | 4/56 | Paulas | 95—89 |
| 2,775,933 | 1/57 | Malone et al. | 101—131 |
| 2,903,964 | 9/59 | Taylor | 96—28 X |
| 3,099,208 | 7/63 | Hodges et al. | 95—89 X |
| 3,152,529 | 10/64 | Erlichman | 95—13 |

NORTON ANSHER, *Primary Examiner.*

EMIL G. ANDERSON, EVON C. BLUNK,
*Examiners.*